United States Patent [19]
Chai

[11] Patent Number: 6,137,915
[45] Date of Patent: Oct. 24, 2000

[54] APPARATUS AND METHOD FOR ERROR CONCEALMENT FOR HIERARCHICAL SUBBAND CODING AND DECODING

[75] Inventor: Bing-Bing Chai, Plainsboro, N.J.

[73] Assignees: Sarnoff Corporation, Princeton, N.J.; Sharp Kabushiki, Osaka, Japan

[21] Appl. No.: 09/377,384

[22] Filed: Aug. 19, 1999

Related U.S. Application Data

[60] Provisional application No. 60/097,295, Aug. 20, 1998.
[51] Int. Cl.[7] ........................................ G06K 9/46
[52] U.S. Cl. ................................................ 382/240
[58] Field of Search ................................ 382/240, 248, 382/250

[56] References Cited

U.S. PATENT DOCUMENTS 5,268,961 12/1993 Ng .................................... 348/845.1
5,353,059 10/1994 Lawlor et al. ......................... 348/398

OTHER PUBLICATIONS

Hasan et al., "Subimage Error Concealment Techniques", Proceedings of the 1998 IEEE International Symposium on, vol. 4, pp. 245–248.

Chung et al., "DCT Based Error Concealment for RTSP Video over a Modem Internet Connection", Proceedings of the 1998 IEEE International Symposium on, vol. 6, pp. 518–521.

Lee H—J Et Al: "An Error Concealment Algorithm for Wavelet–Coded Images Over Packet–Switched Networks" Proceeding of the SPIE, XP000770115 p. 226, line 5–12; figure 3 Jul. 1996.

Hemami S S Et Al: "Subband–Coded Image Reconstruction for Loss Y Packet Networks" IEEE Transactions on Image Processing, US, IEEE Inc. New York, vol. 6, No. 4, pp. 523–559 XP000686223 ISSN: 1057–7149 abstract p. 524, paragraph 3 figure 7 Apr. 4, 1997.

PCT International Search Report corresponding to PCT Application PCT/US99/19087.

*Primary Examiner*—Jose L. Couso
*Assistant Examiner*—Anh Hong Do
*Attorney, Agent, or Firm*—William J. Burke

[57] ABSTRACT

An apparatus and a method for concealing errors in a hierarchical subband coding/decoding system. Specifically, error concealment of a corrupted or missing coefficient is achieved by using uncorrupted coefficient(s) or a window of coefficients corresponding to the same spatial location from other subbands.

20 Claims, 6 Drawing Sheets

APPARATUS AND METHOD FOR ERROR CONCEALMENT FOR HIERARCHICAL SUBBAND CODING AND DECODING

This application claims the benefit of U.S. Provisional Application No. 60/097,295 filed on Aug. 20, 1998, which is herein incorporated by reference.

The invention relates to error concealment in the field of digital multimedia communications. More particularly, the invention relates to an error concealment method that improves error resilience when applied to the coding/decoding of hierarchical subband decomposed coefficients, e.g., wavelet transform coefficients.

BACKGROUND OF THE DISCLOSURE

In the field of digital multimedia communications, data streams carrying video, audio, timing and control data are packaged into various "packets". Generally, a packet is a group of binary digits that include data and control elements which are switched and transmitted as a composite whole. The data, control elements and other information are arranged in various specific formats.

Examples of such formats are disclosed in various international Standards. These standards include, but are not limited to, the Moving Picture Experts Group Standards (e.g., MPEG-1 (11172-*), MPEG-2 (13818-*) and MPEG-4 (14496-*)), H.261 and H.263. For example, MPEG defines a packet as consisting of a header followed by a number of contiguous bytes (payload) from an "elementary data stream". An elementary stream is simply a generic term for one of the coded video, coded audio or other coded bitstreams. More specifically, an MPEG-2 "transport stream" packet comprises a header, which may be four (4) or more bytes long with a payload having a maximum length of 184 bytes. Transport stream packets are part of one or more programs that are assembled into a transport stream. The transport stream is then transmitted over a channel with a particular transfer rate.

However, transmission of packets over a noisy communication channel, e.g., wireless communication, may cause corruption in the packets received by a receiver/decoder. Since, some data streams or bitstreams carry compressed data that are correlated in a manner such that partial loss of a packet may cause the receiver/decoder to discard the entire packet. Namely, compression methods are useful for representing information as accurately as possible with a minimum number of bits and thus minimizing the amount of data that must be stored or transmitted. To further increase compression efficiency, some compression methods employ "significance-based" information, e.g., a significance map-value model, to indicate to a receiver/decoder the significance of the transmitted information or absence of transmitted information. The "significance-based" information is often previously defined, e.g., using symbols, such that the receiver/decoder is able to decipher additional information from the transmitted information. However, the loss of compressed data such as "significance-based" information often results in substantial errors when a receiver/decoder attempts to decompress or decode the corrupted data.

Additionally, another compression techniques involves the transformation of an input image into transform coefficients using hierarchical subband decomposition. For example, a useful compression technique appears in the Proceedings of the International Conference on Acoustics, Speech and Signal Processing, San Francisco, Calif. March 1992, volume IV, pages 657–660, where there is disclosed a signal compression system which applies a hierarchical subband decomposition, or wavelet transform, followed by the hierarchical successive approximation entropy-coded quantizer. A wavelet pyramid, also known as critically sampled quadrature-mirror filter (QMF) subband representation, is a specific type of multiresolution hierarchical subband representation of an image.

More specifically, in a hierarchical subband system, with the exception of the highest frequency subbands, every coefficient at a given scale can be related to a set of coefficients at the next finer scale of similar orientation according to a structure called a wavelet tree. The coefficients at the coarsest scale will be called the parent nodes, and all coefficients corresponding to the same spatial or temporal location at the next finer scale of similar orientation will be called child nodes.

Figure 1:
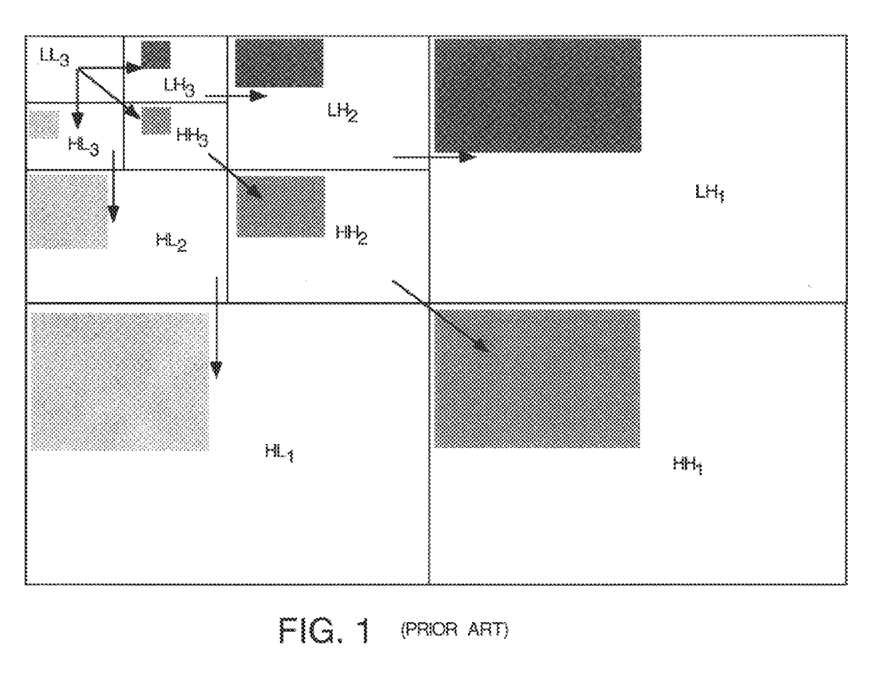
FIG. 1 is a schematic illustration of the parent-child dependencies of subbands in an image decomposed to three levels within a wavelet tree having a plurality of texture units as used in the prior art.

A typical method of coding these transform coefficients is in "tree depth scan order as shown in FIG. 1, where an image is decomposed into three levels of resolution. Specifically, the wavelet coefficients are coded in tree blocks fashion, where each tree block is represented by three separate "texture units" shown with different shadings. Each texture unit is representative of a tree structure starting from the lowest or coarsest AC band to the highest or finest AC band coefficients.

In real life operation, one or more texture units may be corrupted or lost when transmitted over a noisy channel. The loss of these texture units often results in noticeable errors in the decoded image.

Therefore, there is a need in the art for an apparatus and method for concealing such errors due to the loss or corruption of texture units.

SUMMARY OF THE INVENTION

The present invention is an apparatus and a method for concealing errors in a hierarchical subband coding/decoding system. Specifically, in one embodiment, error concealment of a corrupted or missing coefficient is achieved by using uncorrupted coefficient(s) for the same spatial location from other subbands.

In a second embodiment, error concealment of a corrupted or missing coefficient is achieved by using a window of uncorrupted coefficient(s) for the same spatial location from other subbands. The present error concealment method minimizes the effect of loss packets, thereby improving error resilience of a hierarchical subband coding/decoding system.

Furthermore, a plurality of error detection embodiments are also disclosed to aid in the present error concealment method and apparatus. These error detection embodiments utilize Resynch marker, texture unit numbers, packet size and/or forbidden bit pattern to perform error detection.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 2:
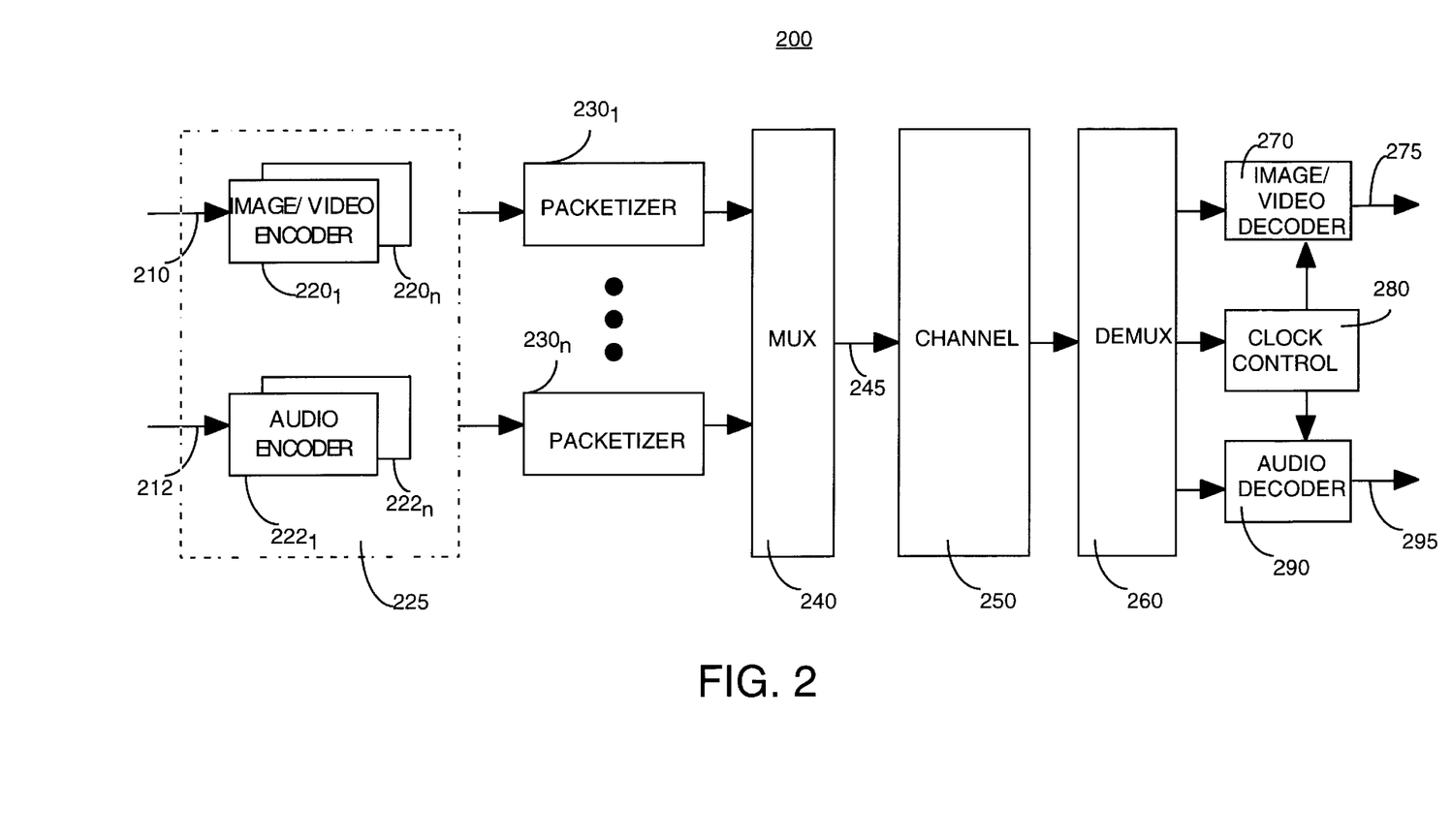
FIG. 2 depicts a block diagram of a simplified packet stream system of the present invention.

FIG. 2 depicts a block diagram of a simplified structure of a packet stream system 200 of the present invention. For illustration, a data stream such as a "transport stream" as defined in accordance with the MPEG standards is used in the packet stream system illustrated in FIG. 2. Although the present invention is described below using the transport stream as an example, those skilled in the art will realize that the present invention can be applied to any packet streams, e.g., an MPEG "program stream" or any other packet streams in accordance with other formats. Furthermore, although the present invention is described below using the term "stream", it should be understood that the various operations described below may be performed on the entire stream or portion thereof.

System 200 includes an image/video encoder 220 for receiving and encoding video data 210 into an elementary video bitstream. The video encoder 220 is an encoder capable of generating hierarchical subband decomposed coefficients, e.g., wavelet coefficients with or without significance-based information. The image/video encoder 220 may be a single image encoder, e.g., a Joint Photographic Experts Group (JPEG) encoder, GIF, PICT, and the like, or an encoder for an image sequence (video), e.g., a block-based or wavelet-based image encoder operating in accordance with an MPEG standard. Throughout this disclosure the terms image sequence, images, and video are used interchangeably. In its broadest sense, the invention operates in cooperation with any form of image or image sequence encoder that would benefit from the present packet structures to provide error resilience.

One example of such an encoder is the Sarnoff Very Low Bit Rate (VLBR) encoder, which is disclosed and claimed in U.S. Pat. No. 5,764,805 (issued on Jun. 9, 1998), and is herein incorporated by reference. Other examples of such encoders are disclosed in U.S. patent application entitled "Apparatus And Method For Encoding Zerotrees Generated By A Wavelet-Based Coding Technique" (filed on Oct. 24, 1996 with Ser. No. 08/736,114), which is herein incorporated by reference.

Similarly, the system may include an audio encoder 222 for receiving and encoding audio data 212 into an elementary audio bitstream. However, those skilled in the art will realize that a plurality of image/video encoders $220_n$ and audio encoders $222_n$ can be employed to produce a plurality of elementary bitstreams. In fact, the plurality of video and audio encoders can be collectively represented by a server 225, which may employ various encoders and/or may simply contain a plurality (or a library) of stored elementary streams in various storage media. Generally, the output of such server contains interleaved program streams.

In turn, these bitstreams are sent to packetizers 230 of the present invention, where the elementary bitstreams are converted into packets. Information for using the packets independently of the transport stream may be added when the packets are formed. Thus, non-audio/video data are allowed, but they are not shown in FIG. 2.

The packets are received and multiplexed by the transport stream multiplexer 240 to produce a transport stream 245. Packets constructed from elementary streams that form a program (a group of "Packet Identifiers" (PIDs) with associated video and audio data) generally share a common time base. Thus, the transport stream may contain one or more programs with one or more independent time bases, where the time bases are used for synchronized presentation. The time bases of different programs within a transport stream may be different.

The transport stream 245 is transmitted over a transmission channel 250, which may further incorporate separate channel specific encoder and decoder (not shown). Next, the transport stream 245 is demultiplexed and decoded by a transport stream demultiplexor 260, where the elementary streams serve as inputs to video decoder 270 and audio decoder 290, whose outputs are decoded video signals 275 and audio signals 295, respectively.

Furthermore, timing information is also extracted by the transport stream demultiplexor 260 and delivered to clock control 280 for synchronizing the video and audio decoders with each other and with the channel. Synchronization of the decoders with the channel is accomplished through the use of the "Program Clock Reference" (PCR) in the transport stream. The PCR is a time stamp encoding the timing of the bitstream itself and is used to derive the decoder timing.

Error resilience is particularly important for packets carrying hierarchically decomposed information, i.e., hierarchical subband decomposed coefficients. Hierarchical subband decomposition provides a multi-resolution representation of an image. For example, the image is first decomposed into four subbands, LL, LH, HL, HH, each representing approximately a quarter of the entire frequency band. To obtain the next coarser scale image representation, the LL band is further divided into four subbands. The process can be repeated to form a hierarchical subband pyramid. It should be understood that hierarchical subband decomposition can apply any number of subband decompositions.

Hierarchical subband decomposed coefficients, e.g., wavelet coefficients, can be packetized into units called "texture packets" for error resilience. A texture packet consists of one or more coding units, named "texture units". Namely, if the texture unit is packetized into a single packet, then the packet is referred to as a texture packet. Examples of various texture unit structures are disclosed in U.S. patent application entitled "Apparatus And Method For Forming A Coding Unit" with attorney docket SAR 13151, which is herein incorporated by reference and is filed simultaneously herewith.

Figure 3:
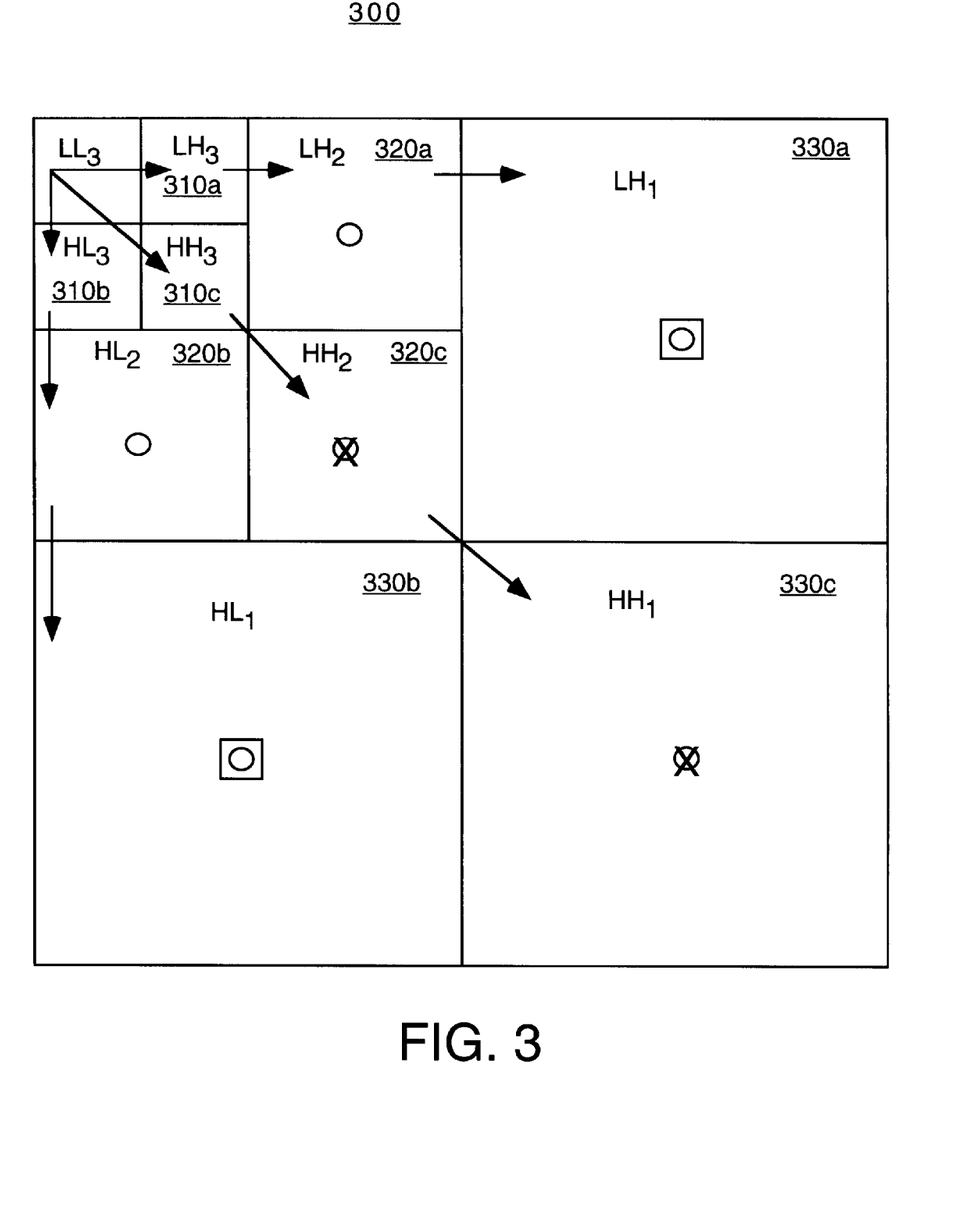
FIG. 3 is a schematic illustration of a wavelet tree having corrupted coefficients and corresponding uncorrupted coefficients that can be used to effect error concealment.

FIG. 3 is a schematic illustration of a wavelet tree 300 having corrupted coefficients and corresponding uncorrupted coefficients that can be used to effect error concealment. Specifically, wavelet tree 300 having three levels is generated by applying hierarchical wavelet decomposition to an input image. To accomplish such image decomposition, the image is decomposed using filtering and times two subsampling in each of two-dimensions into high horizontal-high vertical (HH) 330c, high horizontal-low vertical (HL) 330b, low horizontal-high vertical (LH) 330a, and low horizontal-low vertical (LL), frequency subbands. The LL subband is then further filtered and subsampled times two in each of two dimensions to produce a set of HH 320c, HL 320b, LH 320a and LL subbands. This filtering and subsampling is accomplished recursively to produce an array of subbands such as that illustrated in FIG. 3 where three subsamplings have been used. The parent-child dependencies between subbands are illustrated as arrows pointing from the subband of the parent nodes to the subbands of the child nodes. The lowest frequency subband is the top left $LL_3$, and the highest frequency subband is at the bottom right $HH_1$. In this example, all child nodes have one parent.

In the present invention, error concealment of a corrupted or missing coefficient (shown with an "x" over a circle") is achieved by using uncorrupted coefficient(s) for the same spatial location from other subbands in the same level of resolution (and/or from another level of resolution). For example, in a wavelet pyramid, the pixels in subbands $LH_k$, $HL_k$, $HH_k$, i.e., $(w_k+i, j)$, $(i, h_k+j)$, $(w_k+i, h_k+j)$, correspond to the same spatial location in an image, where i and j are coordinates in the subband of the coefficient and $w_k$ and $h_k$ are the width and height of the subband in the kth layer or decomposition level, respectively For example, a corrupted coefficient in the $HH_2$ subband can be concealed by using uncorrupted coefficient(s) for the same spatial location from the subbands $LH_2$ and $HL_2$ in the same level of resolution. Namely, a new coefficient is generated to replace the corrupted coefficient in the $HH_2$ subband by deriving or extrapolating the new coefficient from the subbands $LH_2$ and $HL_2$ for the same spatial location.

Similarly, a new coefficient can be generated to replace a corrupted coefficient in the $HH_1$ subband by deriving or extrapolating the new coefficient from the subbands $LH_1$ and $HL_1$ for the same spatial location. Thus, the decoded image can be mended with replacement coefficients for any coefficients corrupted or lost in the transmission.

Let $x_0$ be a corrupted coefficient in a wavelet transformed image to be concealed or replaced with a replacement coefficient. Let $x_1$ and $x_2$ be the two coefficients corresponding to the same spatial location in two other subbands and at the same wavelet decomposition level. Then $x_0$ can be concealed as:

$$\hat{x}_0 = f(y_i, z_j; y_i \in w(x_1), z_j \in w(x_2)) \quad (1)$$

where, $w(x)$ is the set of non-corrupted coefficients in the neighborhood of x, where f is a function of pixels $y_i$, $z_j$. It should be noted that the window function $w(x)$ can be limited down to a single coefficient of x. Furthermore, it should be noted that equation (1) may also include a window function for a set of non-corrupted coefficients of x from another decomposition level. Thus, equation (1) can be extended to other decomposition levels expressed as:

$$\hat{x}_0 = f(y_i; y_i \in w(x_k), x_k \in S(x_0)) \quad (1a)$$

where $S(x_0)$ is a set of pixels corresponding to the same spatial location of $x_0$ in one or more decomposition levels. If it is known that $x_0$ is not zero, then the magnitude of $x_0$ can be concealed as:

$$|\hat{x}_0| = \max[|f(y_i, z_j; y_i \in w(x_1), z_j \in w(x_2))|, 1] \quad (2)$$

In one embodiment, if $w(x)$ is limited to a single coefficient of x, then $x_0$ can be expressed as:

$$x_0 = (x_1 + x_2)/2 \quad (3)$$

Figure 4:
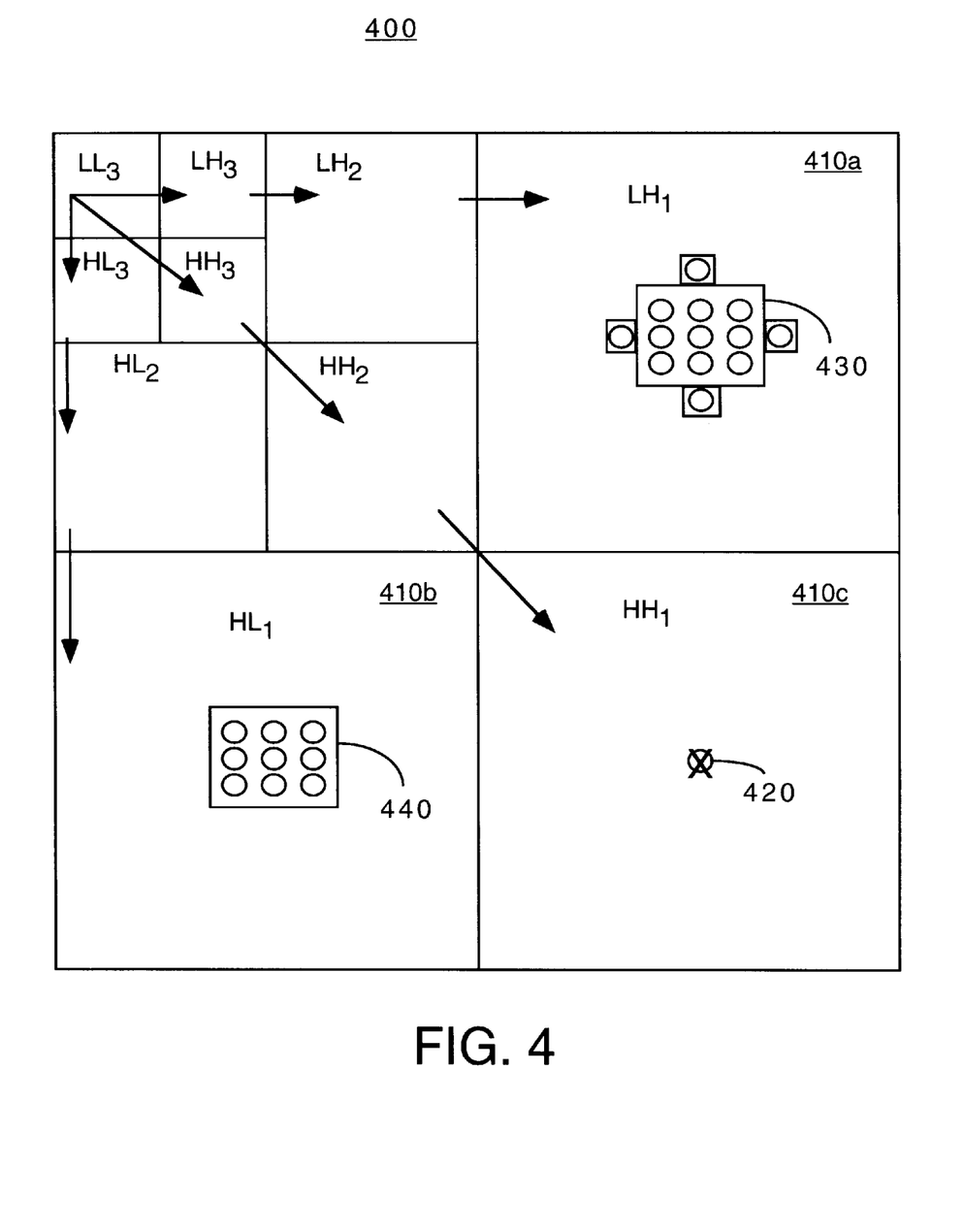
FIG. 4 is a schematic illustration of a wavelet tree having corrupted coefficients and corresponding windows of uncorrupted coefficients that can be used to effect error concealment.

FIG. 4 is a schematic illustration of a wavelet tree 400 having a corrupted coefficient 420 and corresponding windows 430 and 440 of uncorrupted coefficients that can be used to effect error concealment. In fact, if the sign (e.g., positive or negative) of the corrupted coefficient can be recovered, then equation 2 can be refined as follows:

$$\hat{x}_0 = \text{sign}(x_0) * \max\left[\left|\left(\sum_{y_i \in w(x_i)} a_i f(y_i) + \sum_{y_j \in w(x_2)} b_i f(y_j)\right)\right|, 1\right] \quad (4)$$

where $x_0$ is a nonzero coefficient in a wavelet transformed image to be concealed or replaced with a replacement coefficient, $x_1$ and $x_2$ are two coefficients corresponding to the same spatial location in two other subbands and at the same wavelet decomposition level, $w(x)$ is the set of coefficients in the neighborhood of x, $a_i$ and $b_i$ are constants (e.g., set at a value of 1). An example of a method for minimizing the loss of significance information, e.g., retaining at least the sign of a transform coefficient was disclosed in U.S. patent application entitled "Apparatus And Method For Packetizing Significance-Based Information", filed on Aug. 31, 1998 with attorney docket SAR13091 and Ser. No. 09/143,780, which is hereby incorporated by reference.

It should be noted that the functions $f(y_i)$ and $f(y_j)$ can be implemented as any linear and non-linear functions, e.g., a "minimum" (min) function, a "maximum" (max) function, a "median" function or a "weighed average" function. The selection of a particular function can be based on the requirement of a particular application or the content of the image sequence, itself. Additionally, FIG. 4 also illustrates two possible window functions, where one window function includes all adjacent pixels around x and a second window function that includes all adjacent pixels around x plus four additional pixels forming a cross configuration.

Figure 5:
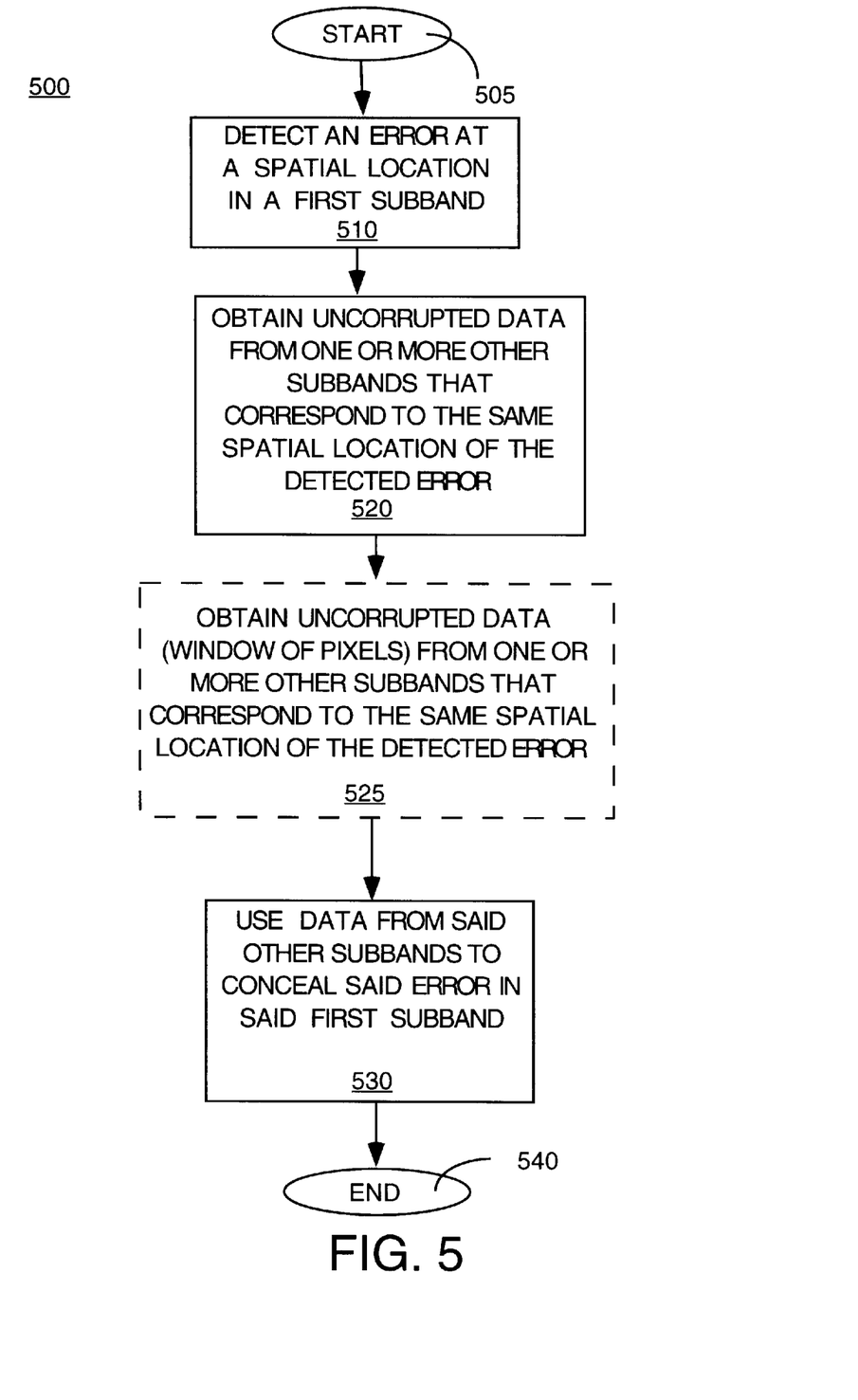
FIG. 5 is a flowchart of a method for concealing error in a hierarchical subband coding/decoding system.

FIG. 5 is a flowchart that summarizes a method 500 for concealing error in a hierarchical subband coding/decoding system. Namely, replacement coefficients are generated to replace those coefficients lost during transmission.

More specifically, method 500 starts in step 505 and proceeds to step 510 where the decoder detects an error at a spatial location in one of the subbands. Namely, one or more transform coefficients may have been corrupted or lost for an image or frame.

In step 520, method 500 obtains uncorrupted data (coefficients) from one or more other subbands in the same decomposition level that correspond to the same spatial location as that of the detected error. In one embodiment, the uncorrupted data comprises one value from each of the other subbands in the same decomposition level corresponding to the same location of the corrupted coefficient.

Alternatively, as shown in dashed lines, in step 525 method 500 may optionally generate a replacement coefficient to conceal each of the corrupted coefficient by obtaining "windows" of uncorrupted data (coefficients) from one or more other subbands in the same decomposition level that correspond to a neighborhood around the same spatial location as that of the detected error. The decision to apply a window function of a particular size or shape is premised on several factors. Namely, the uncorrupted coefficients in the other subbands defined by the window size and shape must be first available to be used to generate the replacement coefficient. For example, depending on the scanning order of a particular coding scheme, uncorrupted data for the same spatial location may not be available when the concealment method is executed, e.g., those coefficients may not have been decoded yet. In such case, the concealment method can be delayed until all available coefficients have been decoded or reconstructed for the entire image, or the concealment method may select a different window size and shape based upon the available uncorrupted data for the same spatial location.

In step 530, replacement coefficients are generated from uncorrupted data from these other subbands, where they are then applied to the decoded image. Method 500 ends in step 540.

In the present invention, error detection step 510 can be implemented in a number of different embodiments. As discussed above, texture data stream is coded in texture packets, with each packet consisting of a variable number of encoding units, i.e., texture units. In operation, each packet typically starts with a resynchronization marker (RESYNCH), that will not appear anywhere else in the packet. The resynchronization marker (RESYNCH) is followed by a first and a last texture unit numbers (TU_first, TU_last) to indicate the first and last texture units that are carried in the present packet. When arithmetic coding is used for entropy coding, the arithmetic coder is reinitialized at the beginning of each packet. The RESYNCH marker can be selected in different ways, e.g., one can choose 17 bits RESYNCH to be equal to (0000 0000 0000 0000 1), where stuffing bits may be needed to prevent occurrence of 16 successive "0" elsewhere in the packet.

Using the above scenario, eight different error detection methods can be implemented. Once an error is detected, the decoding method can implement the present error concealment method in conjunction with other error resilience methods such as disclosed in U.S. patent application entitled "Apparatus And Method For Data Partitioning To Improving Error Resilience" with attorney docket SAR13267, which is herein incorporated by reference and is filed simultaneously herewith.

First, an error condition is detected for a present packet if after successfully decoding the present packet, a corrupted RESYNCH is found at the beginning of the next packet. In turn, the present error concealment should then be applied to the present packet and the data in the previously decoded packet may be deleted starting from the end of the packet up to the point of the most recently decoded segment marker as discussed in SAR13267.

Second, an error condition is detected for a present packet if the RESYNCH marker appears in the middle of a texture unit. Since each texture unit must be fully contained in a packet, this indicates the presence of error. Again, the present error concealment should then be applied.

Third, an error condition is detected for a present packet if the TU_first or TU_last is out of the range of possible texture unit numbers for the current packet. Again, the present error concealment should then be applied.

Fourth, an error condition is detected for a present packet if the TU_first<=prev_TU_last, where prev_TU_last is the TU_last for the previously successfully decoded packet. Again, the present error concealment should then be applied.

Fifth, an error condition is detected for a present packet if the TU_first>TU_last. The texture units are labeled in the encoding order. Thus TU_first should never be larger than TU_last. Again, the present error concealment should then be applied.

Sixth, an error condition is detected for a present packet upon detection of a forbidden bit pattern. For example, if RESYNCH=(0000 0000 0000 0000 1), then an error is detected when 17 successive '0's are found in the packet. Again, the present error concealment should then be applied.

Seventh, an error condition is detected for a present packet if the total number of texture units in a packet does not match TU_last-TU_first+1. Again, the present error concealment should then be applied.

Eighth, an error condition is detected for a present packet if the size of the packet is not reasonable. There is usually a target size for packets. If the target packet size is known to the decoder, and each packet is such that it contains minimum number of texture units to reach (or exceed) the target size, then this condition can be used in error detection. In other words, if the current packet size is longer than the target length and there is still some texture units to be decoded, there must be an error in the present packet. Again, the present error concealment should then be applied.

Thus, depending on the condition of the detected error and/or the implementation of other error resilience methods such as SAR 13267, one or more corrupted texture units in the present packet can now be concealed using the present error concealment method.

Figure 6:
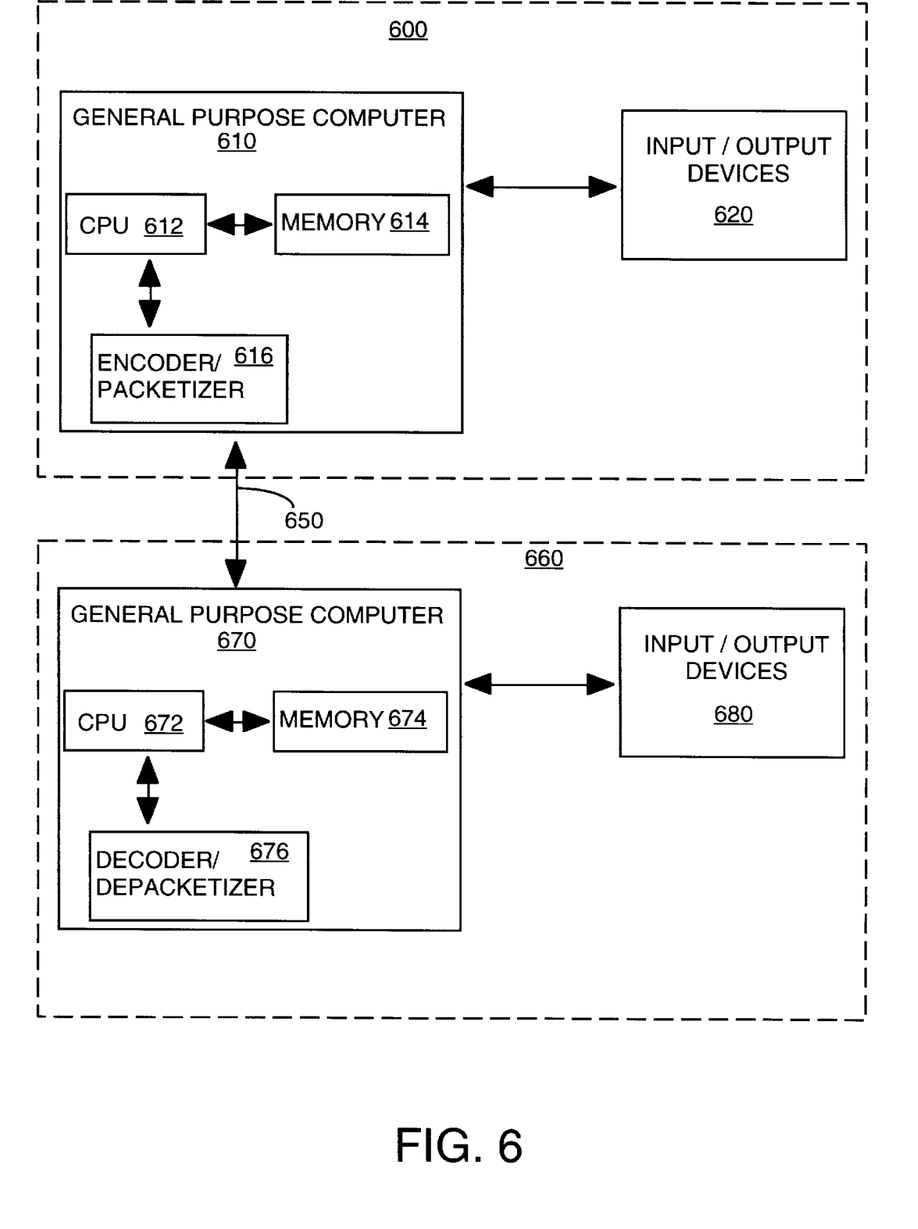
FIG. 6 illustrates a block diagram of an encoding system and a decoding system of the present invention.

FIG. 6 illustrates a block diagram of an encoding system 600 and a decoding system 660 of the present invention. The encoding system 600 comprises a general purpose computer 610 and various input/output devices 620. The general purpose computer comprises a central processing unit (CPU) 612, a memory 614 and an encoder/packetizer 616 for encoding and packetizing an image, video and/or audio signal.

In the preferred embodiment, the encoder/packetizer 616 is simply the video encoder 220, the audio encoder 222 and/or the packetizer 230 as discussed above in FIG. 2. It should be understood that the encoders and the packetizer can be implemented jointly or separately. The encoder/packetizer 616 can be physical devices, which are coupled to the CPU 612 through a communication channel. Alternatively, the encoder/packetizer 616 can be represented by a software application (or a combination of software and hardware, e.g., using application specific integrated circuits (ASIC)), where the software is loaded from a storage medium, (e.g., a magnetic or optical drive or diskette) and operated by the CPU in the memory 614 of the computer. As such, the encoder/packetizer 616 of the present invention can be stored on a computer readable medium.

The computer 610 can be coupled to a plurality of input and output devices 620, such as a keyboard, a mouse, an audio recorder, a camera, a camcorder, a video monitor, any number of imaging devices or storage devices, including but not limited to, a tape drive, a floppy drive, a hard disk drive or a compact disk drive.

The encoding system is coupled to the decoding system via a communication channel 650. The present invention is not limited to any particular type of communication channel.

The decoding system 660 comprises a general purpose computer 670 and various input/output devices 680. The general purpose computer comprises a central processing unit (CPU) 672, a memory 674 and an decoder/depacketizer 676 for receiving and decoding a sequence of encoded images.

In the preferred embodiment, the decoder/depacketizer 676 is simply any decoders that are complementary to the encoder/packetizer 616 as discussed above for decoding the bitstreams generated by the encoder/packetizer 616 and for implementing the error concealment method as described above. The decoder 676 can be a physical device, which is coupled to the CPU 672 through a communication channel. Alternatively, the decoder/depacketizer 676 can be represented by a software application which is loaded from a storage device, e.g., a magnetic or optical disk, and resides in the memory 674 of the computer. As such, any of complementary decoders of the encoder/packetizer 616 of the present invention can be stored on a computer readable medium.

The computer 660 can be coupled to a plurality of input and output devices 680, such as a keyboard, a mouse, a video monitor, or any number of devices for storing or distributing images, including but not limited to, a tape drive, a floppy drive, a hard disk drive or a compact disk drive. The input devices serve to allow the computer for storing and distributing the sequence of decoded video images.

Although various embodiments which incorporate the teachings of the present invention have been shown and described in detail herein, those skilled in the art can readily devise many other varied embodiments that still incorporate these teachings.

What is claimed is:

1. A method for concealing an error in an image, where said image is encoded using hierarchical subband decomposition that decomposes said image into a plurality of subbands, said method comprising the steps of:

(a) detecting at least one corrupted transform coefficient at a spatial location in a first subband;

(b) correlating at least one uncorrupted transform coefficient from at least one other subband at a same decomposition level for said same spatial location of said detected corrupted transform coefficient; and (c) generating a replacement transform coefficient using said at least one uncorrupted transform coefficient for replacing said detected at least one corrupted transform coefficient.

2. The method of claim 1, wherein said at least one other subband comprises a second subband and a third subband.

3. The method of claim 1, wherein said correlating step b) correlates said at least one uncorrupted transform coefficient by using a window function of transform coefficients around a neighborhood that corresponds to said spatial location of said detected corrupted transform coefficient.

4. The method of claim 3, wherein said window function is implemented in accordance with:

$$|\hat{x}_0| = \max\,[|f(y_i, z_j;\, y_i,\, \epsilon w(x_1),\, z_j \epsilon w(x_2))|,\, 1]$$

where $\hat{x}_0$ is said replacement transform coefficient, where $w(x)$ is a set of non-corrupted coefficients in a neighborhood of x, where $x_1$ and $x_2$ are said at least one uncorrupted transform coefficient from at least one other subband, where f is a function of pixels $y_i$, $z_j$.

5. The method of claim 1, wherein said correlating step b) further correlates at least one uncorrupted transform coefficient from at least one other subband at a different decomposition level for said same spatial location of said detected corrupted transform coefficient.

6. The method of claim 1, wherein said detecting step a) detects said at east one corrupted transform coefficient at a spatial location in a first subband by detecting a first texture unit number to be less than or equal to a last texture unit number of a previously decoded packet.

7. The method of claim 1, wherein said detecting step a) detects said at least one corrupted transform coefficient at a spatial location in a first subband by detecting a first texture unit number to be greater than a last texture unit number of a present packet.

8. The method of claim 1, wherein said detecting step a) detects said at least one corrupted transform coefficient at a spatial location in a first subband by detecting an occurrence of a forbidden bit pattern.

9. The method of claim 1, wherein said detecting step a) detects said at least one corrupted transform coefficient at a spatial location in a first subband by detecting a total number of texture units in a present packet to be different from a last texture unit number minus a first texture unit number plus a value one.

10. The method of claim 1, wherein said detecting step a) detects said at least one corrupted transform coefficient at a spatial location in a first subband by detecting an unexpected packet size.

11. An apparatus for concealing an error in an image, where said image is encoded using hierarchical subband decomposition that decomposes said image into a plurality of subbands, said apparatus comprising:

means for detecting at least one corrupted transform coefficient at a spatial location in a first subband;

means for correlating at least one uncorrupted transform coefficient from at least one other subband at a same decomposition level for said same spatial location of said detected corrupted transform coefficient; and means for generating a replacement transform coefficient using said at least one uncorrupted transform coefficient for replacing said detected at least one corrupted transform coefficient.

12. The apparatus of claim 11, wherein said at least one other subband comprises a second subband and a third subband.

13. The apparatus of claim 11, wherein said at least one uncorrupted transform coefficient comprises a window function of transform coefficients around a neighborhood that corresponds to said spatial location of said detected corrupted transform coefficient.

14. The apparatus of claim 13, wherein said window function is implemented in accordance with:

$$|\hat{x}_0| = \max\,[|f(y_i, z_j;\, y_i,\, \epsilon w(x_1),\, z_j \epsilon w(x_2))|,\, 1]$$

where $\hat{x}_0$ is said replacement transform coefficient, where $w(x)$ is a set of non-corrupted coefficients in a neighborhood of x, where $x_1$ and $x_2$ are said at least one uncorrupted transform coefficient from at least one other subband, where f is a function of pixels $y_i$, $z_j$.

15. The apparatus of claim 11, wherein said at least one uncorrupted transform coefficient is from at least one other subband at a different decomposition level for said same spatial location of said detected corrupted transform coefficient.

16. A computer-readable medium having stored thereon a plurality of instructions, the plurality of instructions including instructions which, when executed by a processor, cause the processor to perform the steps comprising of:

(a) detecting at least one corrupted transform coefficient at a spatial location in a first subband;

(b) correlating at least one uncorrupted transform coefficient from at least one other subband at a same decomposition level for said same spatial location of said detected corrupted transform coefficient; and (c) generating a replacement transform coefficient using said at least one uncorrupted transform coefficient for replacing said detected at least one corrupted transform coefficient.

17. The computer-readable medium of claim 16, wherein said at least one other subband comprises a second subband and a third subband.

18. The computer-readable medium of claim 16, wherein said correlating step b) correlates said at least one uncorrupted transform coefficient by using a window function of transform coefficients around a neighborhood that corresponds to said spatial location of said detected corrupted transform coefficient.

19. The computer-readable medium of claim 18, wherein said window function is implemented in accordance with:

$$|\hat{x}_0| = \max \, [f(y_i, z_j; y_i \in w(x_1), z_j \in w(x_2))|, 1]$$

where $\hat{x}_0$ is said replacement transform coefficient, where w(x) is a set of non-corrupted coefficients in a neighborhood of x, where $x_1$ and $x_2$ are said at least one uncorrupted transform coefficient from at least one other subband, where f is a function of pixels $y_i$, $z_j$.

20. The computer-readable medium of claim 16, wherein said correlating step b) further correlates at least one uncorrupted transform coefficient from at least one other subband at a different decomposition level for said same spatial location of said detected corrupted transform coefficient.

* * * * *